Patented Mar. 13, 1928.

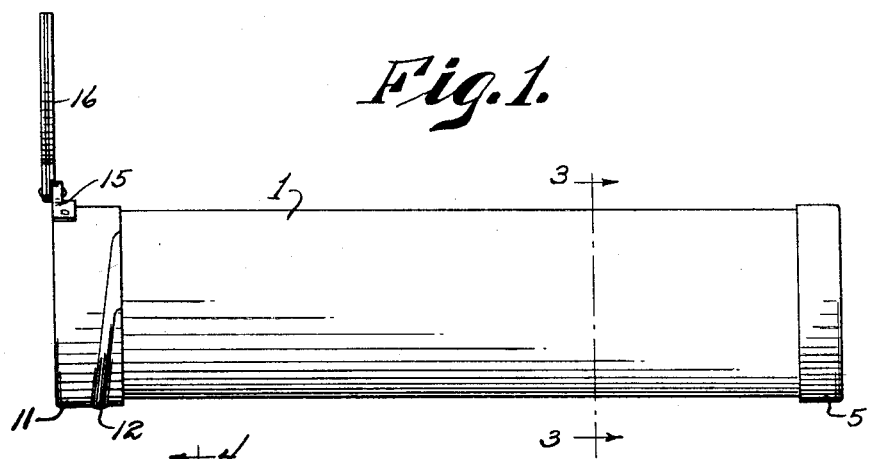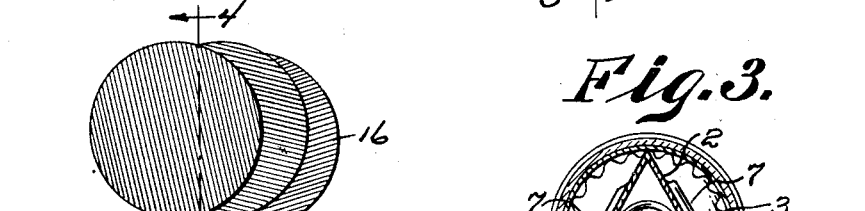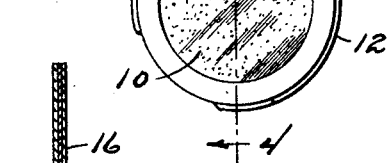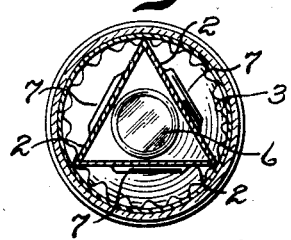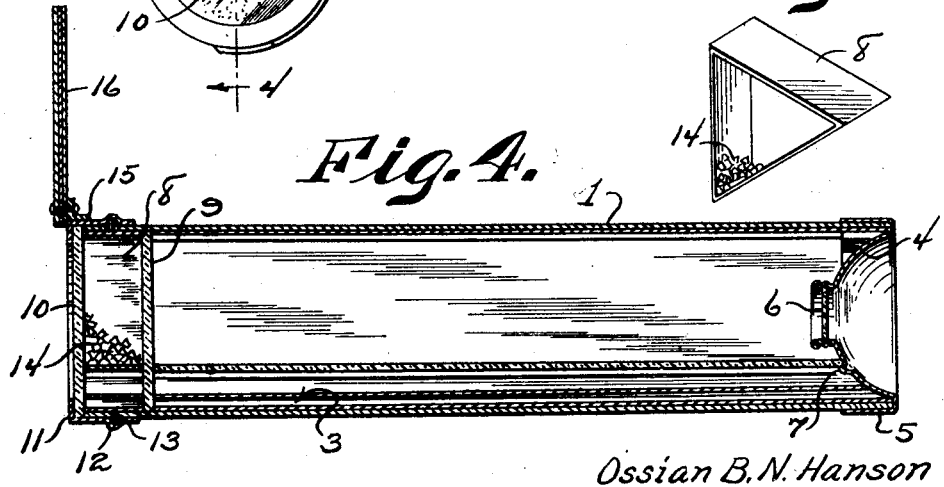

1,662,743

UNITED STATES PATENT OFFICE.

OSSIAN B. N. HANSON, OF WARREN, OHIO.

KALEIDOSCOPE.

Application filed February 23, 1927. Serial No. 170,325.

This invention relates to a kaleidoscope, the general object of the invention being to provide a device which can be manufactured to sell at low cost and which will have considerable strength so that it will not be easily broken or damaged and one in which the image making members are contained in a casing which is easily accessible so that the image making material can be changed whenever desired.

A further object of the invention is to provide a number of colored disks which may be swung over the end of the device in which is located the casing containing the image forming members so that the members will be colored by the light reflected from the disks, which will add to the attractiveness of the designs formed by the members.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Fig. 1 is a side view of the device.

Figure 2 is a view of one end thereof.

Figure 3 is a section on line 3—3 of Figure 1.

Figure 4 is a section on line 4—4 of Figure 2.

Figure 5 is a view of the triangular shaped member for holding the image forming members.

In these views 1 indicates a tube which forms the body of the device and in which is arranged the three mirrors 2 which are placed to form a triangle. The mirrors are placed in a tube 3 of corrugated cardboard or the like which acts to hold them in place and also acts to prevent them from being broken if the device should be dropped or struck a hard blow. The mirrors can be held together by rubber bands placed around them or in any other suitable manner. An eye piece 4 is placed in one end of the tube and is held therein by its flange 5 overlapping the end of the tube. A lens 6, preferably of clear glass, is carried by the small inner end of the eye piece so as to keep dust and dirt out of the device. Ribs 7 are formed on the eye piece which engage the ends of the mirror and act to hold these mirrors in place.

A triangular shaped casing 8 is placed in the opposite end of the tube over a plate 9 of glass which rests on the ends of the mirrors and then a second plate 10 of glass or other transparent material is placed on the casing and these parts are held in place by a cap 11 having a large opening therein, the cap having grooves 12 therein for engaging pins 13 on the tube so that the cap is detachably held on the end of the tube. By removing the cap, the plate 10 may be taken out so that the image forming members 14 in the casing 8 can be renewed or changed. The removal of this cap also permits the other parts of the device to be removed from the tube.

A bracket 15 is fastened to the top part of the cap flange and three disks 16 are pivotally connected with this bracket so that any one of them can be moved to a position where it will come in front of the plate 10 or partly so. The three disks can be so positioned in front of the device that they will all act to color the designs formed by the device or said members can be used one at a time for this purpose. I prefer to make these disks of celluloid. The casing 8 can have its position changed in the device by removing the cap and the plate 10. This plate 10 should be frosted, though the plate 9 should be clear.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A kaleidoscope comprising a tubular body, an eye piece at one end thereof, a cap removably attached to the other end, a triangular shaped casing, a transparent plate on each side thereof, said casing and plates being held in the body by the cap, a triangular shaped member formed of three mirrors placed in the body between the casing and the eye piece and transparent disks of different colors pivotally connected with the cap and arranged to be moved over the cap end of the device.

2. A kaleidoscope comprising a tubular body, an eye piece at one end thereof, a cap removably attached to the other end, a triangular shaped casing, a transparent plate on each side thereof, said casing and plates being held in the body by the cap, a triangular shaped member formed of three mirrors placed in the body between the casing and the eye piece, transparent disks of different colors pivotally connected with the cap and arranged to be moved over the cap end of the device, and a protective holder for the mirrors.

In testimony whereof I affix my signature.

OSSIAN B. N. HANSON.